(12) United States Patent
Wang et al.

(10) Patent No.: US 10,352,798 B2
(45) Date of Patent: Jul. 16, 2019

(54) ANGULAR ROTATION SENSOR SYSTEM

(71) Applicant: Microsemi Corporation, Aliso Viejo, CA (US)

(72) Inventors: Shiju Wang, Irvine, CA (US); Timothy Ronald Jackson, Yorba Linda, CA (US)

(73) Assignee: Microsemi Corporation, Chandler, AZ (US)

( * ) Notice: Subject to any disclaimer, the term of this patent is extended or adjusted under 35 U.S.C. 154(b) by 0 days.

(21) Appl. No.: 15/658,412

(22) Filed: Jul. 25, 2017

(65) Prior Publication Data

US 2018/0031431 A1 Feb. 1, 2018

Related U.S. Application Data

(60) Provisional application No. 62/367,742, filed on Jul. 28, 2016.

(51) Int. Cl.
*G01L 5/00* (2006.01)
*G01L 5/26* (2006.01)
*B62D 15/02* (2006.01)
*G01D 5/00* (2006.01)
*B62D 6/10* (2006.01)
(Continued)

(52) U.S. Cl.
CPC .............. *G01L 5/26* (2013.01); *B62D 6/10* (2013.01); *B62D 15/021* (2013.01); *B62D 15/0215* (2013.01); *B62D 15/0245* (2013.01); *G01D 5/00* (2013.01); *G01D 5/2006* (2013.01); *B62D 5/0409* (2013.01)

(58) Field of Classification Search
CPC .......... G01L 5/26; B62D 6/10; B62D 15/0215
See application file for complete search history.

(56) References Cited

U.S. PATENT DOCUMENTS 4,853,604 A 8/1989 McMullin et al.
6,522,128 B1 2/2003 Ely et al.
(Continued)

FOREIGN PATENT DOCUMENTS

WO 2008/125853 A1 10/2008

OTHER PUBLICATIONS

International Search Report for PCT/US2017/043578 dated Oct. 27, 2017 by the European Patent Office.
(Continued)

*Primary Examiner* — Jamel E Williams
(74) *Attorney, Agent, or Firm* — Glass and Associates; Kenneth Glass

(57) ABSTRACT

An angular rotation sensor system constituted of: an input shaft target and an output shaft target each comprising a plurality of members parallel to a longitudinal axis of an input shaft or output shaft; a gear target with an angular velocity exhibiting a predetermined ratio with an angular velocity of the input shaft, the gear target comprising a plurality of members, each extending away from the input shaft and orthogonal to a plane which is parallel to the longitudinal axis of the input shaft; and a control circuitry arranged to: determine an angular position of the input shaft responsive to a sensed angular rotation of the input shaft target and a sensed angular rotation of the gear target; and determine the amount of torque applied to the input shaft responsive to the sensed angular rotation of the input shaft target and a sensed angular rotation of the output shaft target.

20 Claims, 5 Drawing Sheets

(51) Int. Cl.
  *G01D 5/20*   (2006.01)
  *B62D 5/04*   (2006.01)

(56) References Cited

U.S. PATENT DOCUMENTS

| | | |
|---|---|---|
| 6,605,940 B1 | 8/2003 | Tabrizi et al. |
| 7,726,208 B2 | 6/2010 | Hoeller et al. |
| 8,508,242 B2 | 8/2013 | Shao et al. |
| 8,947,077 B2 | 2/2015 | Lee et al. |
| 9,677,913 B2 | 6/2017 | Wang et al. |
| 2004/0081313 A1 | 4/2004 | Brosh |
| 2007/0001666 A1 | 1/2007 | Lee |
| 2008/0174302 A1 | 7/2008 | Lee et al. |
| 2008/0238416 A1 | 10/2008 | Shiraga et al. |
| 2013/0289826 A1 | 10/2013 | Yoshitake et al. |
| 2016/0214648 A1 | 7/2016 | Schoepe et al. |

OTHER PUBLICATIONS

Written Opinion of the International Searching Authority for PCT/US2017/043578 dated Oct. 27, 2017 by the European Patent Office.

ANGULAR ROTATION SENSOR SYSTEM

BACKGROUND OF THE INVENTION

The invention relates generally to the field of electrical powered steering wheel systems and in particular to a system and method for sensing angular rotation position and torque.

Electrically powered steering wheel systems have been developed to meet the tighter fuel economy standard. This is achieved by replacing a belt-driven hydraulic pump, which is constantly running whether assistance is required or not, with a brushless DC motor (BLDC). The electric motor is activated only when the steering assist is required, thereby saving energy. Another major advantage is the elimination of a belt-driven engine accessory, and several high-pressure hydraulic hoses between the hydraulic pump, mounted on the engine, and the steering gear, mounted on the chassis. This greatly simplifies manufacturing and maintenance. By incorporating electronic stability control, electric power steering systems can instantly vary torque assist levels to aid the driver in corrective maneuvers. As a result, there is a rapid increase in the demand for steering wheel sensing systems which are low cost and reliable.

FIG. 1 illustrates a high level block diagram of an electrical powered steering wheel system 10 known to the prior art, electrical powered steering wheel system 10 comprising: a steering wheel 20; a steering angular position sensor 30; a torque sensor 40; a vehicle speed sensor 50; an electronics control unit (ECU) 60; a motor 70, in one embodiment comprising a BLDC motor; a reduction gear 80; and a steering column 90. Steering angular position sensor 30 is arranged to track the rotation of steering wheel 20 and ECU 60 is arranged to determine the angular position of steering wheel 20 responsive to the tracking of steering angular position sensor 30. ECU 60 is further arranged, in cooperation with torque sensor 40, to determine the torque applied to steering wheel 20. Responsive to the determined angular position and applied torque, ECU 60 is arranged to apply assistive torque via motor 70 to reduction gear 80 or steering column 90. The applied assistive torque is further responsive to the speed of the vehicle detected by vehicle speed sensor 50.

As illustrated, system 10 relies primarily on steering angular position sensor 30 and torque sensor 40. U.S. Pat. No. 7,726,208, granted Jun. 1, 2010 to Hoeller et al., the entire contents of which incorporated herein by reference, is addressed to a combined steering and torque sensor. Unfortunately, the design of Hoeller requires several sensor circuits, which thus requires separate integrated circuits for the steering angle sensor element and the steering torque sensor element, which adds to cost.

SUMMARY OF THE INVENTION

Accordingly, it is a principal object of the present invention to overcome disadvantages of prior art methods and arrangements of. This is provided in the present disclosure by an angular rotation sensor system comprising: an input shaft; an output shaft; a torsion bar coupled between the input shaft and the output shaft; an input shaft target enclosing the input shaft, the input shaft target comprising a plurality of input shaft target members, each of the plurality of input shaft target members exhibiting a face parallel to a longitudinal axis of the input shaft; an output shaft target enclosing the output shaft, the output shaft target comprising a plurality of output shaft target members, each of the plurality of output shaft target members exhibiting a face parallel to a longitudinal axis of the input shaft; a gear target, an angular velocity of the gear target exhibiting a predetermined ratio with an angular velocity of the input shaft, the gear target comprising a plurality of gear target members exhibiting a face orthogonal to the longitudinal axis of the input shaft and to a plane defined by the angular rotation of the gear target; an input shaft target sensor arranged to sense an angular rotation of the input shaft target responsive to relative movement between the face of each of the plurality of input shaft target members and the input shaft target sensor; an output shaft target sensor arranged to sense an angular rotation of the output shaft target responsive to relative movement between the face of each of the plurality of output shaft target members and the output shaft target sensor; a gear target sensor arranged to sense an angular rotation of the gear target responsive to relative movement between the face of each of the plurality of gear target members and the gear target sensor; and a control circuitry, the control circuitry arranged to: determine an angular position of the input shaft responsive to the sensed angular rotation of the input shaft target and the sensed angular rotation of the gear target; determine the torque applied to the input shaft responsive to the sensed angular rotation of the input shaft target and the sensed angular rotation of the output shaft target; and output the determined angular position and the torque of the input shaft.

In one embodiment, the angular rotation sensor system further comprises a printed circuit board (PCB), the input shaft target sensor, the output shaft target sensor and the gear target sensor disposed on the PCB, wherein the PCB defines a plane parallel to the longitudinal axis of the input shaft. In another embodiment, the angular rotation sensor system further comprises a first tooth gear enclosing a second portion of the input shaft, the first tooth gear exhibiting a first number of teeth; and a second tooth gear exhibiting a second number of teeth, the teeth of the second tooth gear meshed with the teeth of the first tooth gear, the gear target coupled to the second tooth gear and arranged to rotate responsive to a rotation of the second tooth gear, wherein the arrangement to determine the angular position of the input shaft is further responsive to the ratio of the first number of teeth to the second number of teeth.

In one embodiment, the second tooth gear is perpendicular to the first tooth gear. In another embodiment, each of the plurality of gear target members extends from a circular base, the parallel plane defined by the circular base.

Independently, the embodiments provide for an angular rotation sensor system comprising: an input shaft target enclosing a first portion of an input shaft, the input shaft target comprising a plurality of input shaft target members, each of the plurality of input shaft target members exhibiting a face parallel to a longitudinal axis of the input shaft; an output shaft target enclosing a portion of an output shaft, the output shaft target comprising a plurality of output shaft target members, each of the plurality of output shaft target members exhibiting a face parallel to a longitudinal axis of the output shaft; a gear target, an angular velocity of the gear target exhibiting a predetermined ratio with an angular velocity of the input shaft, the gear target comprising a plurality of gear target members, each of the plurality of gear target members extending away from the input shaft and exhibiting a face orthogonal to a plane which is parallel to the longitudinal axis of the input shaft; an input shaft target sensor arranged to sense an angular rotation of the input shaft target responsive to relative movement between the face of each of the plurality of input shaft target members and the input shaft target sensor; an output shaft target sensor arranged to sense an angular rotation of the output shaft target responsive to relative movement between the face of each of the plurality of output shaft target members and the output shaft target sensor; a gear target sensor arranged to sense an angular rotation of the gear target responsive to relative movement between the face of each of the plurality of gear target members and the gear target sensor; and a control circuitry, the control circuitry arranged to: determine an angular position of the input shaft responsive to the sensed angular rotation of the input shaft target and the sensed angular rotation of the gear target; determine the amount of torque applied to the input shaft responsive to the sensed angular rotation of the input shaft target and the sensed angular rotation of the output shaft target; and output the determined angular position and the determined torque amount of the input shaft.

In one embodiment, the angular rotation sensor system further comprises a printed circuit board (PCB), the input shaft target sensor, the output shaft target sensor and the gear target sensor disposed on the PCB, wherein the PCB defines a plane parallel to the longitudinal axis of the input shaft. In another embodiment, the angular rotation sensor system further comprises: a first tooth gear enclosing a second portion of the input shaft, the first tooth gear exhibiting a first number of teeth; and a second tooth gear exhibiting a second number of teeth, the teeth of the second tooth gear meshed with the teeth of the first tooth gear, the gear target coupled to the second tooth gear and arranged to rotate responsive to a rotation of the second tooth gear, wherein the arrangement to determine the angular position of the input shaft is further responsive to the ratio of the first number of teeth to the second number of teeth.

In one embodiment, the second tooth gear is perpendicular to the first tooth gear. In another embodiment, each of the plurality of gear target members extends from a circular base, the parallel plane defined by the circular base.

Independently, the embodiments provide for a method of sensing angular rotation, the method comprising: providing an input shaft target enclosing a first portion of an input shaft; providing an output shaft target enclosing a portion of an output shaft; providing a gear target, an angular velocity of the gear target exhibiting a predetermined ratio with an angular velocity of the input shaft; sensing an angular rotation of the input shaft target; sensing an angular rotation of the output shaft target; sensing an angular rotation of the gear target; determining an angular position of the input shaft responsive to the sensed angular rotation of the input shaft target and the sensed angular rotation of the gear target; determining the amount of torque applied to the input shaft responsive to the sensed angular rotation of the input shaft target and the sensed angular rotation of the output shaft target; and outputting the determined angular position and the determined torque amount of the input shaft.

In one embodiment, the provided input shaft target comprises a plurality of input shaft target members, each of the plurality of input shaft target members exhibiting a face parallel to a longitudinal axis of the input shaft. In another embodiment, the sensing of an angular rotation of the input shaft target is responsive to relative movement between the face of each of the plurality of input shaft target members and an input shaft target sensor.

In one embodiment, the output shaft target comprises a plurality of output shaft target members, each of the plurality of output shaft target members exhibiting a face parallel to a longitudinal axis of the output shaft. In another embodiment, the sensing of an angular rotation of the output shaft target is responsive to relative movement between the face of each of the plurality of output shaft target members and an output shaft target sensor.

In one embodiment, the gear target comprises a plurality of gear target members, each of the plurality of gear target members extending away from the input shaft and exhibiting a face orthogonal to a plane which is parallel to the longitudinal axis of the input shaft. In another embodiment, the sensing of an angular rotation of the gear target is responsive to relative movement between the face of each of the plurality of gear target members and a gear target sensor.

In one embodiment, the provided input shaft target comprises a plurality of input shaft target members, each of the plurality of input shaft target members exhibiting a face parallel to a longitudinal axis of the input shaft, and wherein the sensing an angular rotation of the input shaft target is responsive to relative movement between the face of each of the plurality of input shaft target members and an input shaft target sensor. In another embodiment, the output shaft target comprises a plurality of output shaft target members, each of the plurality of output shaft target members exhibiting a face parallel to a longitudinal axis of the output shaft, and wherein the sensing an angular rotation of the output shaft target is responsive to relative movement between the face of each of the plurality of output shaft target members and an output shaft target sensor. In one further embodiment, the gear target comprises a plurality of gear target members, each of the plurality of gear target members extending away from the input shaft and exhibiting a face orthogonal to a plane which is parallel to the longitudinal axis of the input shaft, and wherein the sensing an angular rotation of the gear target is responsive to relative movement between the face of each of the plurality of gear target members and a gear target sensor Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1:
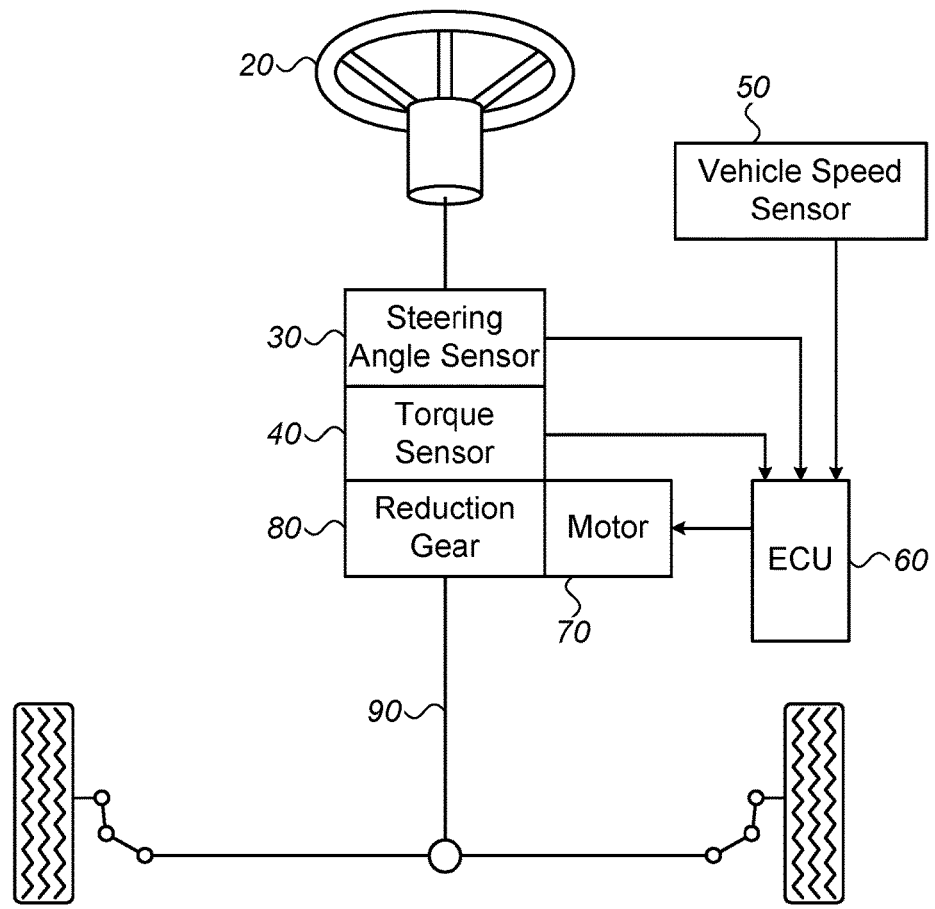
FIG. 1 illustrates a high level block diagram of an electrical power steering wheel system, as known to the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
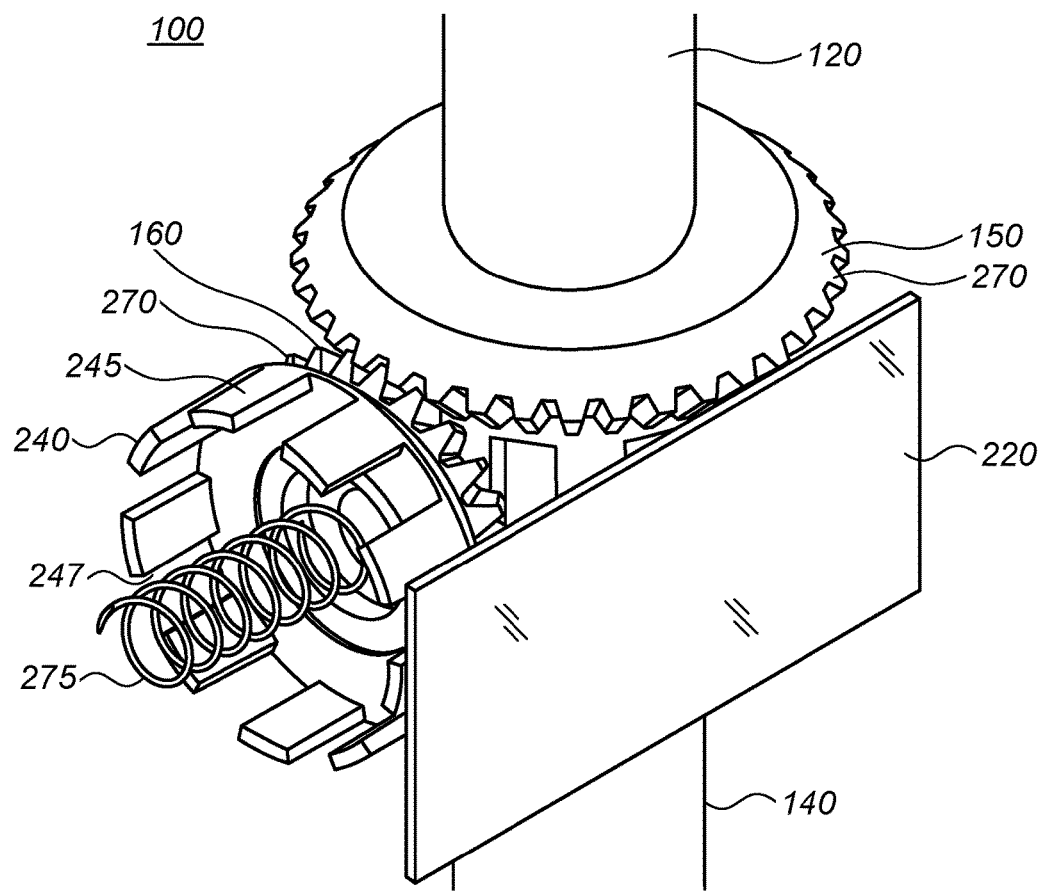
FIGS. 2A-2E illustrate various views of an angular rotation sensing system, according to certain embodiments.
Figure 2B:
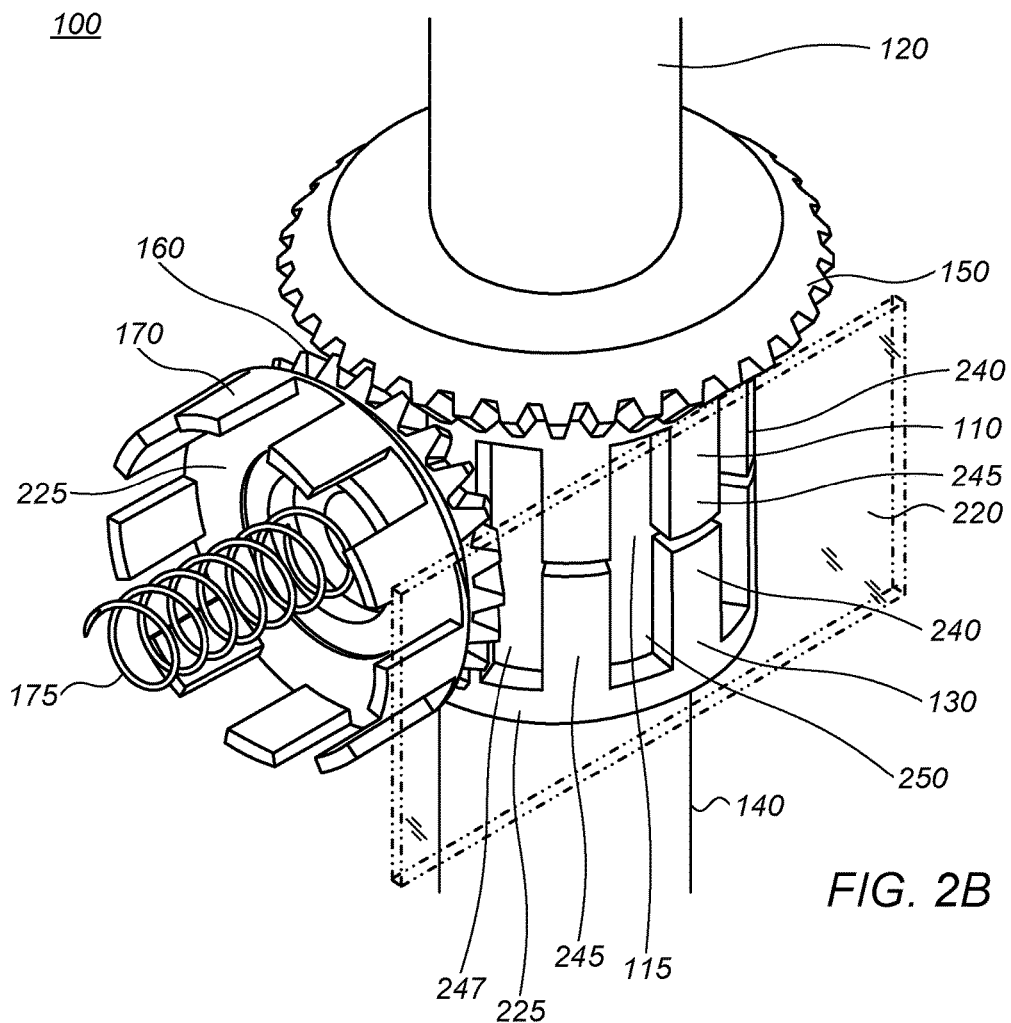
Figure 2C:
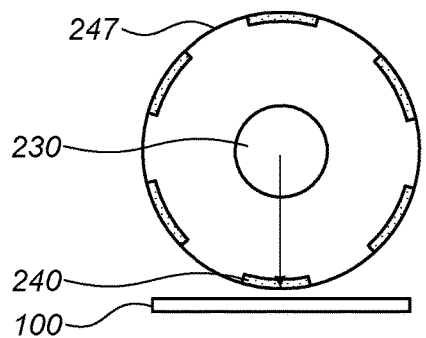
Figure 2C:
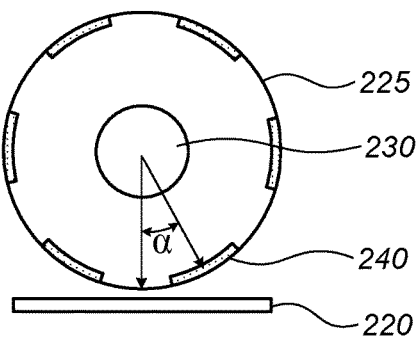
Figure 2D:
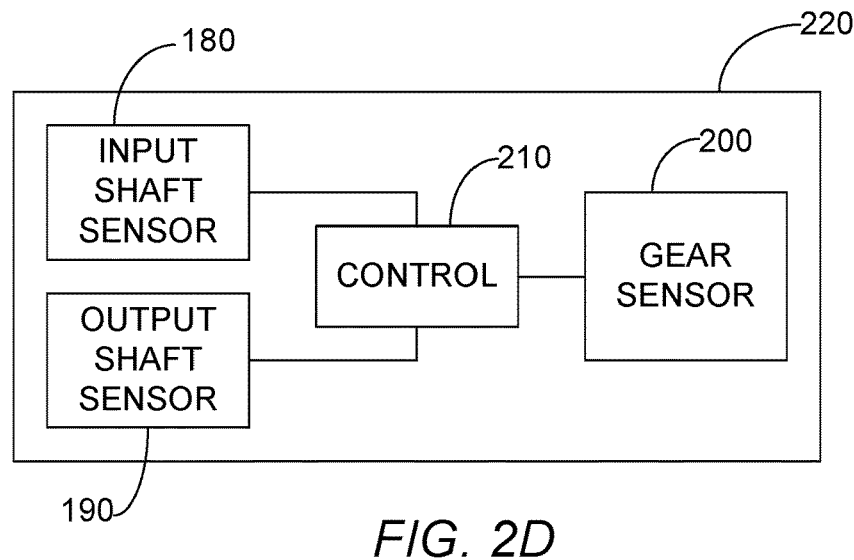
Figure 2E:
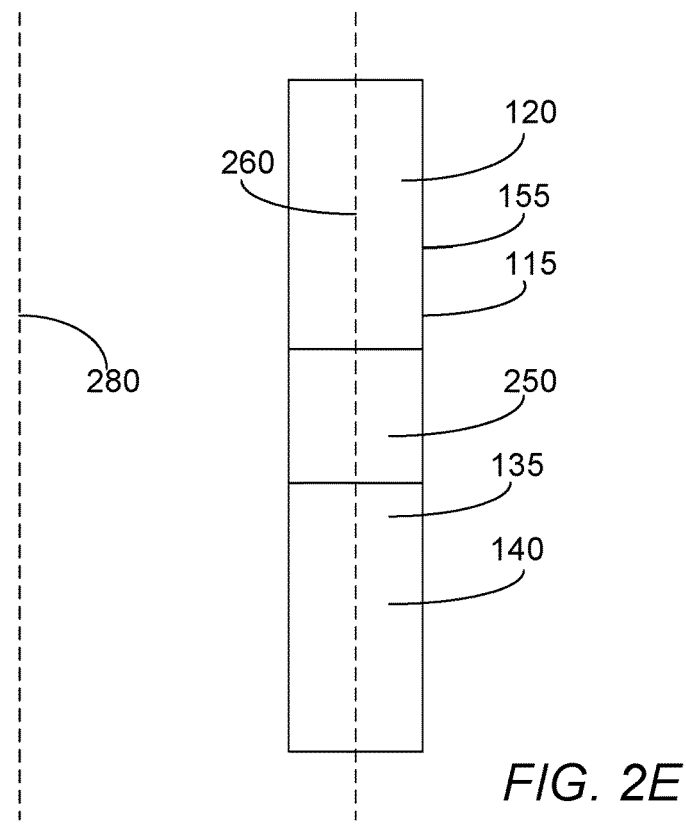
Figure 2F:
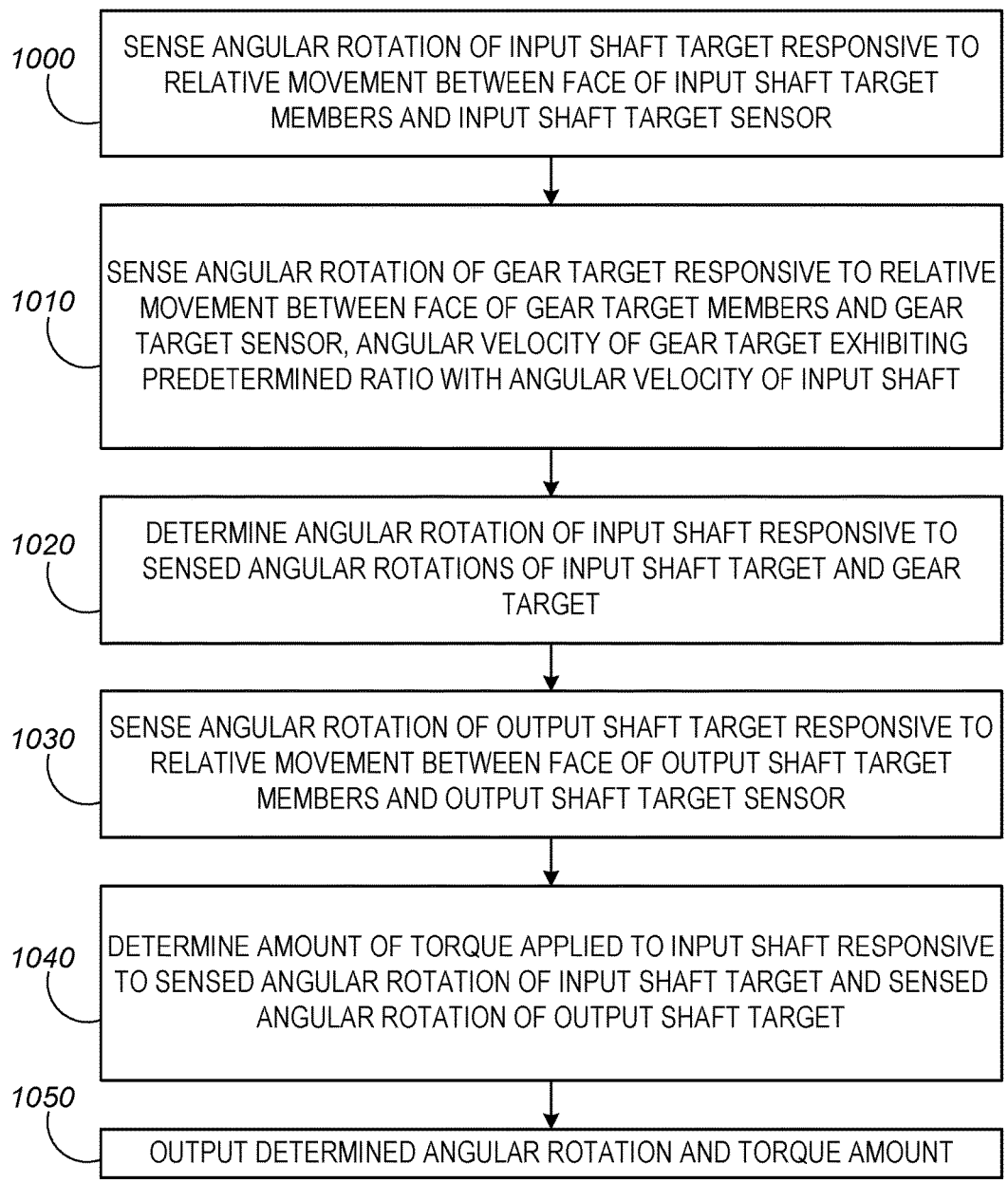
FIG. 2F illustrates a high level flow chart of a method of operation of a control circuitry of the angular rotating sensing system, according to certain embodiments.

FIG. 2A illustrates various views of a high level schematic view of an angular rotation sensing system 100, according to certain embodiments. FIG. 2B illustrates angular rotation sensing system 100, with a PCB 220 partially transparent; FIG. 2C illustrates a high level top view of a circular base 225 and with a plurality of elongated members 240 in different positions in relation to PCB 220; FIG. 2D illustrates a high level block diagram of PCB 220; FIG. 2E illustrates a high level side view of an input shaft 120, an output shaft 140 and a torsion bar 250; and FIG. 2F illustrates a high level flow chart of the method of the operation of an input shaft target sensor 180, an output shaft target sensor 190, a gear target sensor 200 and a control circuitry 210, FIGS. 2A-2F being described together.

Angular rotation sensing system 100 comprises: an input shaft target 110 enclosing a portion 115 of input shaft 120; an output shaft target 130 enclosing a portion 135 of output shaft 140; a tooth gear 150 enclosing a portion 155 of input shaft 120 and in communication with an end of input shaft target 110; a tooth gear 160 arranged to mesh with tooth gear 150; a gear target 170; a spring 175; an input shaft target sensor 180; output shaft target sensor 190; gear target sensor 200; control circuitry 210; and printed circuit board (PCB) 220 having thereon input shaft target sensor 180, output shaft target sensor 190, gear target sensor 200 and control circuitry 210. Advantageously, only a single PCB 220 is required, in place of the multiple PCBs of the prior art.

Each of input shaft target 110, output shaft target 130 and gear target 170 comprises: a circular base 225 exhibiting a hole 230 in the center thereof; and the plurality of elongated members 240 extending perpendicularly from the edge of circular base 225 at a maximal radial distance from hole 230. In one embodiment, elongated members 240 are each composed of a conductive material. In one embodiment, elongated members 240 of each of input shaft target 110, output shaft target 130 and gear target 170 are all similar to each other. In another embodiment, the elongated members 240 of gear target 170 are different from the elongated members 240 of input shaft target 110 and output shaft target 130.

Each elongated member 240 exhibits an outer face 245 which extends along the length of elongated member 240, i.e. extends from circular base 225, and faces away from circular base 225. Input shaft 120 is coupled to output shaft 140 via torsion bar 250 such that input shaft 120, torsion bar 250 and output shaft 140 form an elongated bar which allows for a temporary angular displacement about a joint central longitudinal axis due to the action of torsion bar 250. In one embodiment, portion 115 of input shaft 120 is between portion 155 thereof and torsion bar 250 such that input shaft target 110 is positioned between tooth gear 150 and torsion bar 250. In one embodiment tooth gear 150 is disposed coaxially with input shaft target 110 at a face of the respective circular base 225 opposing respective elongated members 240.

Input shaft 120 extends through hole 230 of input shaft target 110 and output shaft 140 extends through hole 230 of output shaft target 130. In one embodiment, elongated members 240 of input shaft target 110 and elongated members 240 of output shaft target 130 each extend away from torsion bar 250 along a common longitudinal axis 260. Outer face 245 of each elongated member 240 of input shaft target 110 and outer face 245 of each elongated member 240 of output shaft target 130 are generally parallel to the common longitudinal axis 260 of input shaft 120 and output shaft 140, i.e. the common longitudinal axis of the bar formed by input shaft 120, torsion bar 250 and output shaft 140.

Tooth gear 150 exhibits a first number of teeth 270 and tooth gear 160 exhibits a second number of teeth 270, the ratio of the number of teeth 270 of tooth gear 160 to the number of teeth 270 of tooth gear 150 being a predetermined value. Tooth gear 160 is positioned perpendicularly to tooth gear 150 and teeth 270 of tooth gear 160 are meshed with teeth 270 of tooth gear 150 such that a rotation of tooth gear 150 causes a rotation of tooth gear 160, the ratio of the angular velocity of tooth gear 160 to the angular velocity of tooth gear 150 being equal to the value of the tooth number ratio. Gear target 170 is coupled to tooth gear 160 in a parallel position such that elongated members 240 thereof each extend away from input shaft 120 and outer face 245 of each elongated member 240 thereof is orthogonal to a plane 280, plane 280 being parallel to longitudinal axis 260. Spring 175 extends from tooth gear 160, through hole 230 of gear target 170, to a housing (not shown). Spring 175 applies a small amount of force on tooth gear 160 which minimizes any backlash/slop in the meshing of tooth gears 150 and 160.

In one embodiment, each of input shaft target sensor 180, output shaft target sensor 190 and gear target sensor 200 comprises a planar coil. Each of input shaft target sensor 180, output shaft target sensor 190 and gear target sensor 200 is in communication with control circuitry 210, and control circuitry 210 is in communication with a motor or other ECU (not shown) for providing assistive torque, as described above. In one embodiment, PCB 220 exhibits a generally planar shape parallel to longitudinal axis 260. Input shaft 120 is in mechanical communication with a steering wheel (not shown) and output shaft 140 is in mechanical communication with a steering column (not shown).

In operation, in stage 1000, when input shaft 120 rotates due to rotation of the steering wheel, input shaft target sensor 180 is arranged to sense the angular rotation of input shaft target 110 responsive to relative movement therebetween. Particularly, input shaft sensor 180 outputs a different amount of voltage when outer face 245 of an elongated member 240 of input shaft target 110 is presented to it than when a gap 247 between adjacent elongated members 240 of input shaft target 110 is presented to it. As illustrated in FIG. 2C, in a first position 290, an elongated member 240 of input shaft target 110 is directly in front of PCB 220 and input shaft target sensor 180 is arranged to output an amount of voltage indicating that that is the position of an elongated member 240 of input shaft target 110 in relation thereto. In a second position 300, the elongated member 240 of input shaft target 110 exhibits an angle α with PCB 220 and input shaft target sensor 180 is arranged to output an amount of voltage responsive to angle α. Thus, control circuitry 210 is arranged to detect the change from position 290 to position 300, exhibiting angle α, and determine the change in the angular position of input shaft 120 responsive thereto. Those skilled in the art will recognize that such an arrangement can discriminate rotation over a single gap 247, and can not distinguish rotation over multiple gaps 247, i.e. the total discrimination is equal to 360°/the number of elongated members 240 of input shaft target 110.

Due to the rotation of input shaft 120, tooth gear 160 rotates, the rate of rotation being a function of the tooth number ratio with tooth gear 150, as described above. In stage 1010, gear target sensor 200 is arranged to sense the angular rotation of gear target 170 responsive to relative movement therebetween, as described above in relation to input shaft target sensor 180. Particularly, as described above in relation to input shaft target sensor 180, gear target sensor 200 outputs a different voltage when outer face 245 of an elongated member 240 of gear target 170 is presented to it than when gap 247 between adjacent elongated members 240 of gear target 170 is presented to it. Control circuitry 210 is arranged to receive the detection voltages from both input shaft target sensor 180 and gear target sensor 200. In stage 1020, control circuitry 210 is arranged to determine the angular rotation of input shaft 120, in relation to an initial position thereof, responsive to the detected angular rotations of input shaft target 110 and gear target 170. Specifically, control circuitry 210 is arranged to determine how much the steering wheel, and input shaft 120, were rotated. In a typical vehicle, the steering wheel can be rotated up to 540 degrees in each direction. Due to the rotational velocity difference between input shaft target 110 and gear target 170, control circuitry 210 can accurately determine the amount of rotation up to, and greater than, 540 degrees in each direction by using both the measurement of the rotation of input shaft target 110 and the measurement of the rotation of gear target 170. In particular, the gearing ratio and the respective number of elongated members 240 of each of input shaft target 110 and gear target 170 are selected so as to provide a unique output for each measurement over the range of allowed motion.

In stage 1030, output shaft target sensor 190 is arranged to sense the angular rotation of output shaft target 130 responsive to relative movement therebetween, as described above in relation to input shaft target sensor 180. Particularly, as described above, output shaft target sensor 200 outputs a different amount of voltage when outer face 245 of an elongated member 240 of output shaft target 130 is presented to it than when gap 247 of output shaft target 130 is presented to it. When an angular force is applied to the steering wheel, input shaft 120 immediately rotates accordingly. The rotation of output shaft 140, and as a result output shaft target 130, lags behind the rotation of input shaft 120 due to the torsion constant of torsion bar 250. In stage 1040, control circuitry 210 is arranged to determine the difference between the voltage amounts output by input shaft target sensor 180 and output shaft target sensor 190 and determine the amount of torque applied to input shaft 120 responsive to the determined difference and the torsion constant of torsion bar 250. In stage 1050, control circuitry 210 is arranged to output the determined angular rotation of stage 1020 and the determined amount of applied torque of stage 1040.

Advantageously, a single PCB 220 is utilized for both angular rotation and torque detection. Additionally, due to the shapes and positions of input shaft target 110 and output shaft target 130, elongated members 240 of input shaft target 110 and output shaft target 130 don't interfere with each other when being detected by the respective sensors.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. An angular rotation sensor system comprising:
   an input shaft;
   an output shaft;
   a torsion bar coupled between said input shaft and said output shaft;
   an input shaft target enclosing a first portion of said input shaft, said input shaft target comprising a plurality of input shaft target members, each of said plurality of input shaft target members exhibiting a face parallel to a longitudinal axis of said input shaft;
   an output shaft target enclosing a portion of said output shaft, said output shaft target comprising a plurality of output shaft target members, each of said plurality of output shaft target members exhibiting a face parallel to a longitudinal axis of said output shaft;
   a gear target, an angular velocity of said gear target exhibiting a predetermined ratio with an angular velocity of said input shaft, said gear target comprising a plurality of gear target members, each of said plurality of gear target members extending away from said input shaft and exhibiting a face orthogonal to a plane which is parallel to the longitudinal axis of said input shaft;
   an input shaft target sensor arranged to sense an angular rotation of said input shaft target responsive to relative movement between said face of each of said plurality of input shaft target members and said input shaft target sensor;
   an output shaft target sensor arranged to sense an angular rotation of said output shaft target responsive to relative movement between said face of each of said plurality of output shaft target members and said output shaft target sensor;
   a gear target sensor arranged to sense an angular rotation of said gear target responsive to relative movement between said face of each of said plurality of gear target members and said gear target sensor; and
   a control circuitry, said control circuitry arranged to:

determine an angular position of said input shaft responsive to said sensed angular rotation of said input shaft target and said sensed angular rotation of said gear target;

determine the amount of torque applied to said input shaft responsive to said sensed angular rotation of said input shaft target and said sensed angular rotation of said output shaft target; and output said determined angular position and said determined torque amount of said input shaft.

2. The angular rotation sensor system of claim 1, further comprising a printed circuit board (PCB), said input shaft target sensor, said output shaft target sensor and said gear target sensor disposed on said PCB, wherein said PCB defines a plane parallel to the longitudinal axis of said input shaft.

3. The angular rotation sensor system of claim 1, further comprising:
a first tooth gear enclosing a second portion of said input shaft, said first tooth gear exhibiting a first number of teeth; and
a second tooth gear exhibiting a second number of teeth, said teeth of said second tooth gear meshed with said teeth of said first tooth gear, said gear target coupled to said second tooth gear and arranged to rotate responsive to a rotation of said second tooth gear,
wherein said arrangement to determine the angular position of said input shaft is further responsive to the ratio of the first number of teeth to the second number of teeth.

4. The angular rotation sensor system of claim 3, wherein said second tooth gear is perpendicular to said first tooth gear.

5. The angular rotation sensor system of claim 1, wherein each of said plurality of gear target members extends from a circular base, said parallel plane defined by said circular base.

6. An angular rotation sensor system comprising:
an input shaft target enclosing a first portion of an input shaft having a longitudinal axis, said input shaft target comprising a plurality of input shaft target members, each of said plurality of input shaft target members rotating about the longitudinal axis of said input shaft;
an output shaft target enclosing a portion of an output shaft having a longitudinal axis, said output shaft target comprising a plurality of output shaft target members, each of said plurality of output shaft target members rotating about the longitudinal axis of said output shaft;
a gear target, an angular velocity of said gear target exhibiting a predetermined ratio with an angular velocity of the input shaft, said gear target comprising a plurality of gear target members, each of said plurality of gear target members rotating about an axis orthogonal to the longitudinal axis of said input shaft;
an input shaft target sensor arranged to sense an angular rotation of said input shaft target responsive to relative movement between said face of each of said plurality of input shaft target members and said input shaft target sensor;
an output shaft target sensor arranged to sense an angular rotation of said output shaft target responsive to relative movement between said face of each of said plurality of output shaft target members and said output shaft target sensor;
a gear target sensor arranged to sense an angular rotation of said gear target responsive to relative movement between said face of each of said plurality of gear target members and said gear target sensor; and
a control circuitry, said control circuitry arranged to:
determine an angular position of the input shaft responsive to said sensed angular rotation of said input shaft target and said sensed angular rotation of said gear target;
determine the amount of torque applied to the input shaft responsive to said sensed angular rotation of said input shaft target and said sensed angular rotation of said output shaft target; and
output said determined angular position and said determined torque amount of said input shaft.

7. The angular rotation sensor system of claim 6, further comprising a printed circuit board (PCB), said input shaft target sensor, said output shaft target sensor and said gear target sensor disposed on said PCB,
wherein said PCB defines a plane parallel to the longitudinal axis of said input shaft.

8. The angular rotation sensor system of claim 6, further comprising:
a first tooth gear enclosing a second portion of said input shaft, said first tooth gear exhibiting a first number of teeth; and
a second tooth gear exhibiting a second number of teeth, said teeth of said second tooth gear meshed with said teeth of said first tooth gear, said gear target coupled to said second tooth gear and arranged to rotate responsive to a rotation of said second tooth gear,
wherein said arrangement to determine the angular position of said input shaft is further responsive to the ratio of the first number of teeth to the second number of teeth, and wherein said second tooth gear is perpendicular to said first tooth gear.

9. The angular rotation sensor system of claim 6, wherein each of said plurality of gear target members extend from a circular base, each of said plurality of gear target members having a rounded face that is substantially concentric to said circular base.

10. The angular rotation sensor system of claim 9, wherein said circular base extends in a plane that is parallel to the center axis of said input shaft.

11. A method of sensing angular rotation, the method comprising:
providing an input shaft target enclosing a first portion of an input shaft;
providing an output shaft target enclosing a portion of an output shaft;
providing a gear target, an angular velocity of said gear target exhibiting a predetermined ratio with an angular velocity of the input shaft;
sensing an angular rotation of said input shaft target;
sensing an angular rotation of said output shaft target;
sensing an angular rotation of said gear target;
determining an angular position of said input shaft responsive to said sensed angular rotation of said input shaft target and said sensed angular rotation of said gear target;
determining the amount of torque applied to said input shaft responsive to said sensed angular rotation of said input shaft target and said sensed angular rotation of said output shaft target; and
outputting said determined angular position and said determined torque amount of said input shaft.

12. The method according to claim 11, wherein said provided input shaft target comprises a plurality of input shaft target members, each of said plurality of input shaft target members exhibiting a face parallel to a longitudinal axis of said input shaft.

13. The method according to claim 12, wherein said sensing an angular rotation of said input shaft target is responsive to relative movement between said face of each of said plurality of input shaft target members and an input shaft target sensor.

14. The method according to claim 11, wherein said provided output shaft target comprises a plurality of output shaft target members, each of said plurality of output shaft target members exhibiting a face parallel to a longitudinal axis of said output shaft.

15. The method according to claim 14, wherein said sensing an angular rotation of said output shaft target is responsive to relative movement between said face of each of said plurality of output shaft target members and an output shaft target sensor.

16. The method according to claim 11, wherein said gear target comprises a plurality of gear target members, each of said plurality of gear target members extending away from the input shaft and exhibiting a face orthogonal to a plane which is parallel to the longitudinal axis of the input shaft.

17. The method according to claim 16, wherein said sensing an angular rotation of said gear target is responsive to relative movement between said face of each of said plurality of gear target members and a gear target sensor.

18. The method according to claim 11, wherein said provided input shaft target comprises a plurality of input shaft target members, each of said plurality of input shaft target members exhibiting a face parallel to a longitudinal axis of said input shaft, and wherein said sensing an angular rotation of said input shaft target is responsive to relative movement between said face of each of said plurality of input shaft target members and an input shaft target sensor.

19. The method according to claim 18, wherein said output shaft target comprises a plurality of output shaft target members, each of said plurality of output shaft target members exhibiting a face parallel to a longitudinal axis of said output shaft, and wherein said sensing an angular rotation of said output shaft target is responsive to relative movement between said face of each of said plurality of output shaft target members and an output shaft target sensor.

20. The method according to claim 19, wherein said gear target comprises a plurality of gear target members, each of said plurality of gear target members extending away from the input shaft and exhibiting a face orthogonal to a plane which is parallel to the longitudinal axis of the input shaft, and wherein said sensing an angular rotation of said gear target is responsive to relative movement between said face of each of said plurality of gear target members and a gear target sensor.

* * * * *